United States Patent

Sørensen

[11] Patent Number: 6,016,656
[45] Date of Patent: Jan. 25, 2000

[54] HYDRAULIC CONTROL DEVICE

[75] Inventor: Ole Vincentz Sørensen, Nordborg, Denmark

[73] Assignee: Danfoss A/S, Nordborg, Denmark

[21] Appl. No.: 09/117,633

[22] PCT Filed: Feb. 18, 1997

[86] PCT No.: PCT/DK97/00072

§ 371 Date: Jul. 31, 1999

§ 102(e) Date: Jul. 31, 1999

[87] PCT Pub. No.: WO97/30881

PCT Pub. Date: Aug. 28, 1997

[30] Foreign Application Priority Data

Feb. 24, 1996 [DK] Denmark .......................... 196 07 064

[51] Int. Cl.[7] .................................................. F16D 31/02
[52] U.S. Cl. .................................................. 60/384; 60/403
[58] Field of Search ............................. 60/384, 403, 386

[56] References Cited

U.S. PATENT DOCUMENTS 4,942,935  7/1990  Lech ....................................... 60/403 X
5,806,561  9/1998  Pedersen et al. ...................... 60/384 X

*Primary Examiner*—John E. Ryznic
*Attorney, Agent, or Firm*—Lee, Mann, Smith, McWilliams, Sweeney & Ohlson

[57] ABSTRACT

A hydraulic control device is disclosed, having a pressure connection and a tank connection and having a metering pump unit (4) that comprises at least two metering pumps (5, 6) connected hydraulically in parallel and operable mechanically in parallel and also a cut-off valve (8) in hydraulic connection between the two metering pumps (5, 6), the cut-off valve (8) being flange-mounted on a metering pump (6) and having in a housing (13) a slider member (12) which, under pressure form the pressure connection (P), is movable axially towards the metering pump (6). It is desirable to keep wear and tear to a low level such a control device. For that purpose, a displacement-limiting device (26, 28) for the slider member (12) is provided, which prevents the slider member from bearing on the metering pump (6).

11 Claims, 2 Drawing Sheets

HYDRAULIC CONTROL DEVICE

BACKGROUND OF THE INVENTION

The invention relates to a hydraulic control device having a pressure connection and a tank connection and having a metering pump unit that comprises at least two metering pumps connected hydraulically in parallel and operable mechanically in parallel and also a cut-off valve in a hydraulic connection between the two metering pumps, the cut-off valve being flange-mounted on a metering pump and having in a housing a slider member which, under pressure from the pressure connection, is movable axially towards the metering pump.

Such a control device is preferably used to steer vehicles. The metering pump unit is in this case connected by way of a directional valve to a steering motor. Both the metering pumps and the directional valve are connected to a steering handwheel or to a comparable device. When the steering handwheel is turned, the directional valve is displaced in the desired direction and the metering pump unit continues to convey hydraulic fluid until the steering motor has reached the desired position. In normal undisturbed operation, both metering pumps are operative. They can convey a correspondingly large volume of hydraulic fluid, which allows the steering motor to respond rapidly to movements of the steering handwheel.

When the pressure at the pump connection drops or fails for any reason, for example, because the supply pump responsible is defective, the metering pumps can be used in a so-called "emergency operation" also as auxiliary pumps. In that case the metering pumps are then used to generate the pressure of the hydraulic fluid. For this, the necessary energy has to be introduced by way of the steering handwheel, that is, generally by human muscle power. To relieve the operator of the effort involved in this, it is known from DE 22 28 531 C2 to provide a cut-off valve, by means of which, when the pressure at the pump connection fails, the second metering pump is switched off. The operator then has to operate only one metering pump. For the same movement of the steering motor he then has to turn the steering handwheel further, but the effort involved is less.

It is precisely with vehicle steering systems that it is desirable always to keep the necessary installation space as small as possible, and also to make the parts required for the steering as light-weight as possible. For that reason, in the control device according to DE 22 28 531 C2, the two metering pumps are flanged to one another. In addition, the cut-off valve is also flange-mounted on one of the metering pumps. In normal operation, when the pressure connection is supplied with pump pressure of the supply pump, the slider member of the cut-off valve is pressed by this pressure from the pressure connection against the adjacent metering pump. Since it is desirable to use no more material than necessary for the housing of the metering pump, this may possibly result in deformation of the housing of that metering pump under the pressure of the slider member. Although this does not impair the ability of the metering pump to function, the wear and tear that occurs is in some cases considerable, and can shorten the service life of the control device. This wear and tear occurs not only through the axial wear in the gear assembly adjacent to the cut-off valve. Because of the increased friction, both pumps have to be acted upon with an increased pressure and, because of the relatively high pressure difference over the gear wheels, this leads to greater wear in the two gear assemblies.

SUMMARY OF THE INVENTION

The invention is therefore based on the problem of reducing the wear and tear in such a control device.

That problem is solved in a hydraulic control device of the kind mentioned in the introduction in that a displacement-limiting device is provided for the slider member, which prevents the slider member from bearing on the metering pump.

The displacement-limiting device therefore stops the slider member in the housing before it comes to bear on the metering pump. At the same time, the slider member is therefore prevented from being able to exert corresponding forces on the metering pump or the housing of the metering pump. Accordingly, deformation of the housing of the metering pump is also avoided. The friction inside the housing of the metering pump is then not increased further, so that wear and tear can be kept at a lower level. An advantage of this construction is that the housing of the metering pump requires no change. In particular, it needs no reinforcement, which would normally give rise to an increase in weight and/or to an enlargement of the installation space, both of which are undesirable.

In an advantageous construction, the displacement-limiting device is in the form of a mechanical stop member in the housing. The forces that position the slider member so that it unblocks the connection between the two metering pumps are then absorbed by the housing, and are not therefore passed on to the metering pump. Without great difficulty, however, the housing can made strong enough to be able to absorb these pressures or forces, without being deformed.

In this connection it is preferred for the slider member to have at least one radially extending projection which co-operates with the stop member. The displacement-limiting device can in the process be removed from the actual movement area of the slider member, so that neither the movement of the slider member in the region provided for that purpose nor any flows of hydraulic fluid that ought possibly to be controlled by the slider member are disrupted. The fact that the projection extends radially moreover makes a larger area available for the application of force, so that parts of smaller dimensions are sufficient for absorbing the forces.

In this connection the projection is preferably arranged in the region of the end of the slider member remote from the metering pump. The necessary installation space is generally available there. Manufacture is consequently simplified. Moreover, virtually the entire housing thickness is available for absorbing the retaining forces.

It is especially advantageous for the stop member to be formed by a diametral enlargement of a housing bore receiving the slider member. A diametral enlargement of this kind can be made very easily. At the moment at which the slider member is inserted with its radially projecting projection into the housing bore, the stop member with which the projection can co-operate is also already present.

The projection is preferably circumferential. There is therefore a uniform distribution of force in the circumferential direction. There is little danger that the slider member will tilt and therefore become canted and jammed.

In this connection it is an advantage for the projection to be interrupted by an anti-rotation groove in which a securing element built into the housing engages. It is simple to make such a groove in the projection, for example by sawing or milling. Since this groove is located in a radially outer position, the anti-rotation means acts with a correspondingly large leverage, so that the necessary securing elements can be made somewhat less strong.

In addition or as an alternative thereto, the slider member can have a connecting channel between its side wall and its end face remote from the metering pump. The pressure connection then opens into the circumferential wall of the housing bore in which the slider member is arranged in such a way that the mouth of the pressure connection and the mouth of the channel coincide in a predetermined position range of the slider member which is shorter in the axial direction than the path traversed by the slider member until it comes to bear on the metering pump, and a throttle is arranged parallel to the slider member. With this construction the drive for the slider member is, as it were, interrupted before the slider member comes to bear on the pump. The pressure from the pressure connection is able to propagate as far as the end face of the slider member only through the channel. In this case, however, it is requirement that the pressure from the pressure connection can reach the channel in the first place. That is possible only for such time as the channel and the pressure connection coincide with one another. As soon as the overlap ends, no hydraulic fluid can continue to flow. The hydraulic fluid that has built up the pressure on the end face of the slider member, reduces its pressure by way of the throttle that is arranged parallel with the slider member. In this manner a relatively stable positioning of the slider member in the housing can be achieved at a position which still has the required spacing from the metering pump housing.

The throttle is preferably arranged in the slider member. This facilitates manufacture. It is sufficient for the slider member to be provided with a through-bore which then either itself forms the throttle or is provided for receiving a throttling unit.

It is also preferred for the pressure connection and/or the channel to open by way of an annular groove into the side wall or circumferential wall. With this construction, it no longer matters whether the slider member is aligned in the correct rotated position relative to the pressure connection. On the contrary, the hydraulic fluid is able to spread by way of the annular groove uniformly over the circumference of the slider member and the housing bore. It is important merely that the annular groove or the annular grooves coincide suitably in the axial direction.

The distance between the mouth of the pressure connection into the circumferential wall and a mechanical stop member for the slider member on the side remote from the metering pump is preferably larger than the path traversed by the slider member until it comes to bear on the metering pump. Since the mouth of the channel, for example, the annular groove, has a smaller axial dimension than the path traversed by the slider member until it comes to bear on the metering pump, but the distance between the mouth of the pressure connection and the stop member is still larger than that path, it is possible in this way to ensure that the sealing face of the slider member in the circumferential direction is large enough to protect the pressure chamber at its end face with the necessary reliability against the admission of hydraulic fluid under pressure.

BRIEF DESCRIPTION OF THE DRAWINGS

The invention is described in the following with reference to preferred embodiments in conjunction with the drawings, in which.

DETAILED DESCRIPTION OF THE INVENTION

Figure 1:
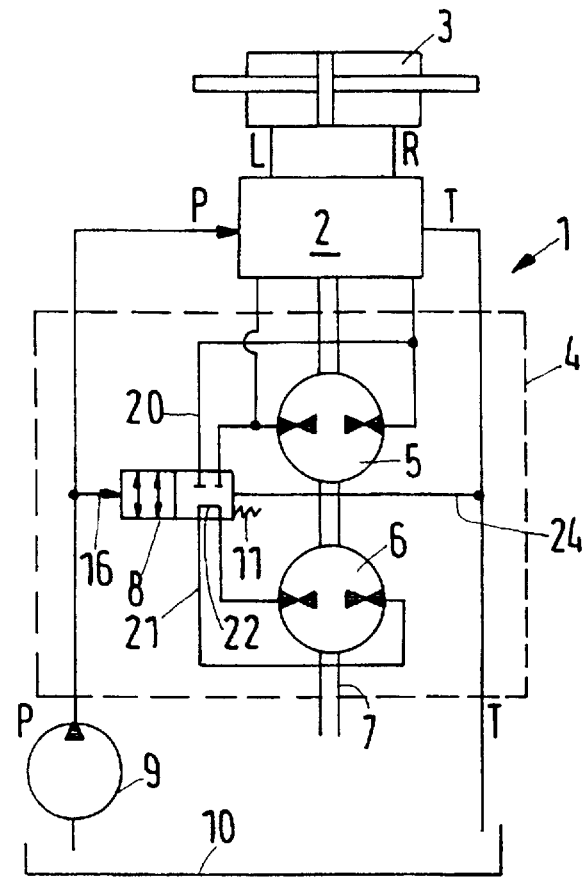
FIG. 1 is a diagrammatic circuit layout of a control device.

A hydraulic control device 1 illustrated diagrammatically in FIG. 1 comprises a directional valve 2, which is connected to two working connections L, R that are arranged to be connected to a steering motor 3. Further, a pump or pressure connection P and a tank connection T are provided.

The other side of the directional valve 2 is connected to a metering pump unit 4, which comprises a first metering pump 5 and a second metering pump 6 which are connected hydraulically in parallel and are operable mechanically in parallel by way of a common shaft 7, which also operates the directional valve 2.

The concept that the first and the second metering pumps 5, 6 are connected in parallel means that the input connection of the metering pump 5 is connected or can be connected to the corresponding input connection of the second metering pump 6 and the output connection of the first metering pump 5 is connected or can be connected to the corresponding output connection of the second metering pump 6. The metering pump unit 4 in fact comprises also a cut-off valve 8, which is able to interrupt this connection between the first metering pump 5 and the second metering pump 6. In the position shown in FIG. 1, the connection is interrupted and the second metering pump 6 is short-circuited, so that on rotation of the shaft 7 only the first metering pump 5 is able to convey hydraulic fluid towards the directional valve 2.

Operation of such a control device 1 per se is known. A pump 9 conveys hydraulic fluid from a tank 10 to the directional valve 2. At the same time the cut-off valve 8 is displaced against the force of a spring 11 into a position in which the two metering pumps 5, 6 are connected hydraulically in parallel.

If the shaft 7 is now operated, hydraulic fluid passes by way of the directional valve 2 to the steering motor 3. The amount of hydraulic fluid is here determined by the two metering pumps 5, 6.

If the pump 9 fails, that is, if there is no pressure at the pump connection P of the directional valve 2, the cut-off valve 8 cuts out, that is, it interrupts the connection between the two metering pumps 5, 6. Only the metering pump 5 is still able to work together with the directional valve 2. When the shaft 7 is turned, the metering pump 5 conveys the hydraulic fluid required for operation of the steering motor 3.

Normally, yet further connections and lines are provided, in particular a load pressure control connection LS, but this is not shown here for reasons of clarity.

Figure 2:
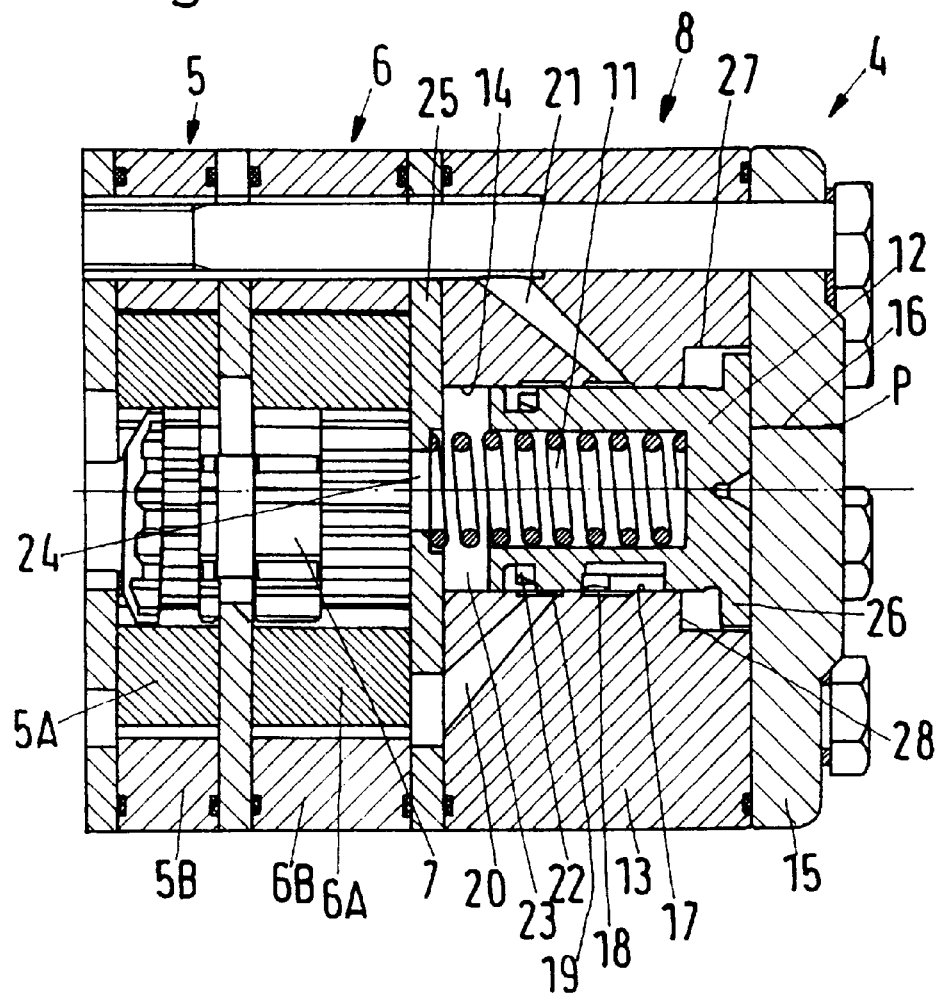
FIG. 2 is a diagrammatic cross-section through a first embodiment of a metering device.

FIG. 2 shows in more detail the construction of a metering pump unit 4 in which the two metering pumps 5, 6 are flanged together with the cut-off valve 8. Here, the first metering pump 5 has a gear assembly 5A, 5B and the second metering pump has a gear assembly 6A, 6B. Both gear assemblies have the same diameter and the same orientation with respect to one another. The gear assembly 5A, 5B has a smaller axial length than the gear assembly 6A, 6B of the second pump, however. The first metering pump 5 accordingly also has a smaller capacity than the second metering pump, that is, for the same angle of rotation it conveys less fluid than the second metering pump 6. The mechanical connection between the two gear assemblies is effected by way of the shaft 7.

The cut-off valve 8 flange-mounted on the second metering pump 6 comprises a slider member 12 which is mounted so as to be axially displaceable in a housing 13 having a housing bore 14. The housing 13 is closed by a cover 15.

A control pressure line 16, which is connected to the pump connection P of the directional valve 2 (indicated purely diagrammatically) enables the end face of the slider member 12 remote from the metering pump 6 to be acted on by pressure. When the pressure P acts on the control pressure line 16, the slider member 12 is displaced towards the second metering pump 6. For this, the slider member 12 has grooves 17 running in an axial direction, by means of which it is able to interconnect grooves 18, 19 that are provided in the inner wall of the housing bore 14. The grooves 18, 19 have a predetermined length circumferentially. They are in turn connected to lines 20, 21 which enable the first metering pump 5 to be connected to the second metering pump.

Furthermore, an annular groove 22 is provided in the slider member 12, by means of which groove the lines 21 can be short-circuited.

The end face of the slider member 12 adjacent to the metering pump 6 is subjected to the pressure in a pressure chamber 23 which is connected to a control connection 24, indicated purely diagrammatically. The control connection 24 is in its turn connected to the tank connection T of the directional valve 2.

If the full pump pressure P were allowed to act on the slider member 12, the slider member 12 would bear with considerable force on a cover plate 25 of the second metering pump 6, which force could deform this cover plate 25, indeed so that considerable wear and tear of the gear assembly 6A, 6B of the second metering pump would ensue.

In order to prevent the slider member 12 from bearing on the cover plate 25 of the metering pump 6, the slider member 12 is formed with a circumferential and radially projecting projection 26 which is arranged in a diametral enlargement 27 of the housing bore 14. The distance between the projection 26 and a stop face 28, which is formed by this diametral enlargement 27, is less than the distance between the end face of the slider member facing the second metering pump 6 and the cover plate 25. Thus, before the slider member 12 comes to bear on the cover plate 25 of the second metering pump 6, the projection 26 comes to bear on the stop face 28. The forces which displace the slider member 12 towards the metering pump 6 are thus already absorbed in the housing 13, so that they are unable to reach the metering pump 6. In this connection the stop face 28 is arranged at the end of the housing 13 remote from the metering pump 6. Virtually the full thickness of the housing is therefore available for absorption of forces.

Figure 3:
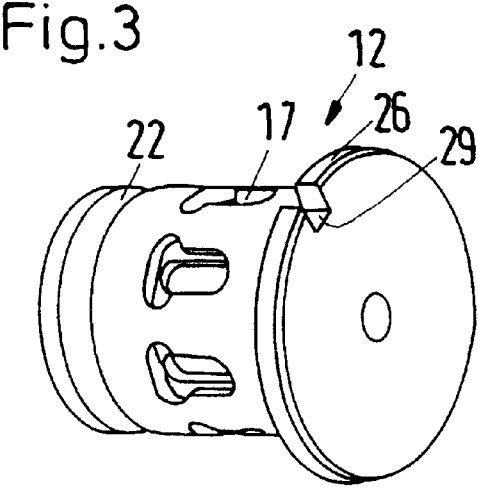
FIG. 3 is a perspective view of a slider member of that metering device.

As can be seen from FIG. 3, a groove 29 can be provided in the projection 26 as well, in order to provide an anti-rotation means there.

The projection 26 need not be circumferential. It would be sufficient to provide individual, preferably symmetrically distributed, radially projecting projections. The circumferential projection 26 has the advantage, however, that it can be made in a simple manner so that is absorbs the necessary forces. It need not be unduly thick. An axial extent of from 3 to 5 mm has proved satisfactory in most cases.

The projection 26 and the stop face 28 therefore form here a displacement-limiting means for the slider member. Movement of the slider member 12 beyond a certain extent is reliably prevented.

Figure 4:
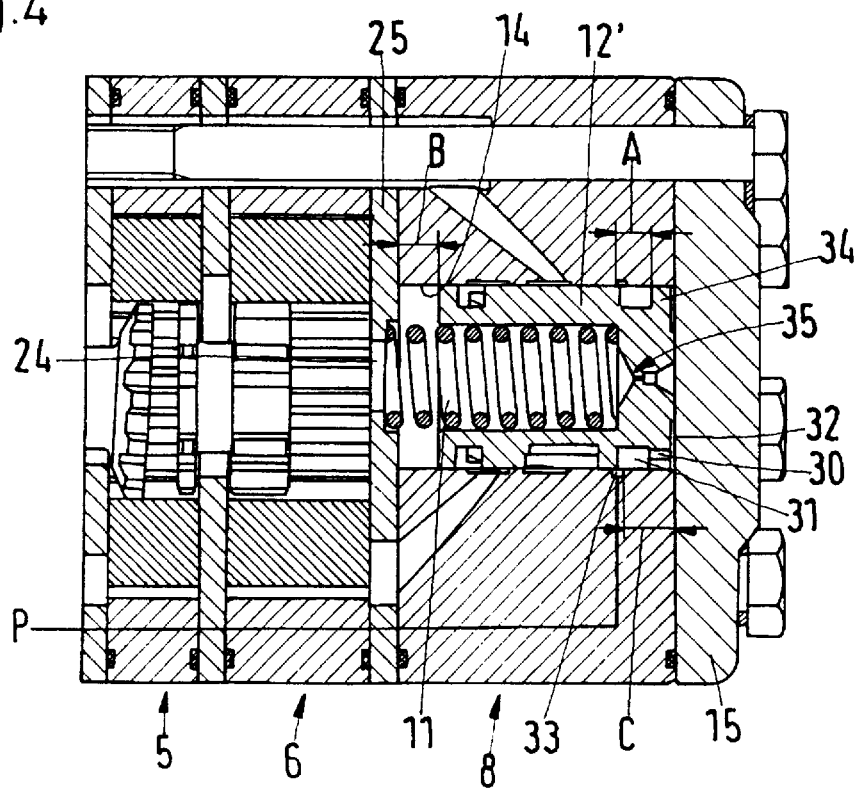
FIG. 4 shows a further embodiment of a metering device.

FIG. 4 shows an alternative construction, in which identical parts have been provided with the same reference numbers and corresponding parts have been provided with primed reference numbers.

The slider member 12' has no circumferential projection in this embodiment. The displacement-limiting means is here formed by a combination of the following features: the slider member 12' has a channel 30 which is connected to a circumferential groove 31 and leads to the end face 32 of the slider member 12'. In the housing bore 14 there is provided a further circumferential groove 33 which is connected to the pressure connection P. Provided that the circumferential groove 31 coincides with the groove 33, hydraulic fluid is able to flow under the pressure P through the channel 30 to the end face 32 of the slider member 12'.

Between the end face 32 and the circumferential groove 31 there is provided an apron 34 which, when the slider member 12' has been displaced far enough towards the metering pump 6, closes the groove 33.

Furthermore, in the slider member 12 there is a throttle 35 which lies hydraulically parallel to the slider member, that is, between the pump connection P and the tank connection T that is connected to the control line 24.

In this connection the axial distance A, which is necessary for the apron 34 to cover over the groove 33, is less than the distance B which the slider member 12' has to traverse before it comes to bear on the cover plate 25 of the metering pump 6. Even larger is a distance C between the groove 33 and the cover 15, which here serves as stop member for the slider member 12'. Thus, A<B<C.

The cut-off valve 8 according to FIG. 4 operates as follows: when there is pressure at the pressure connection P, this passes by way of the groove 33, the circumferential groove 31 and the channel 30 to the end face 32 of the slider member 12' and displaces the slider member 12' against the force of the spring 11 towards the metering pump 6. Before the slider member 12' comes to bear on the cover plate 25 (for which it would be necessary for it to traverse the distance B), the apron 34 (after traversing the distance A) closes the groove 33, so that further supply of hydraulic fluid under pressure to the end face 32 of the slide valve 12' is prevented. The pressure at the end face 32 then reduces by way of the throttle 35, and the slider member 12' is pushed by the force of the spring 11 away from the metering pump 6 again, so that the groove 33 is again uncovered. The slider member 12' can therefore never come to bear on the cover plate 25. In fact, sooner or later a state of equilibrium will occur, in that an additional throttle is formed between the grooves 31, 33 so that the pressure drop across the two throttles 31, 33 and 35 is of the same magnitude as the counter-force exerted by the spring 11.

This last solution can also be used in conjunction with a mechanical stop member which can assume, for example, an additional securing function.

In each case an excessively large pressure force on the cover plate 25 is avoided, so that wear and tear, in particular of the metering pump 6, can be reduced.

I claim:

1. Hydraulic control device having a pressure connection and a tank connection, a metering pump unit comprising at least two metering pumps connected hydraulically in parallel and operable mechanically in parallel, a cut-off valve in a hydraulic connection between the two metering pumps, the cut-off valve being flange-mounted on a metering pump and having in a housing a slider member which, under pressure from the pressure connection, is movable axially towards the metering pump, and a displacement-limiting device for the slider member to prevent the slider member from bearing on the metering pump.

2. Hydraulic control device according to claim 1, in which the displacement-limiting device comprises a mechanical stop member in the housing.

3. Hydraulic control device according to claim 2, in which the slider member includes at least one radially extending projection which co-operates with the stop member.

4. Hydraulic control device according to claim 3, in which the projection is located at an end of the slider member remote from the metering pump.

5. Hydraulic control device according to claim 1, in which the stop member comprises a diametral enlargement of a housing bore receiving the slider member.

6. Hydraulic control device according to claim 3, in which the projection is circumferential.

7. Hydraulic control device according to claim 6, in which the projection includes an anti-rotation groove engagable by a securing element fixed to the housing.

8. Hydraulic control device according to claim 1, in which the slider member includes a connecting channel between a side wall and an end face remote from the metering pump, the pressure connection opening into a circumferential wall of a housing bore for the slider member, the pressure connection having a mouth coinciding with a mouth of the channel in a predetermined position range of the slider member, which range is shorter in the axial direction than a path traversed by the slider member until it bears on the metering pump, and including a throttle located parallel to the slider member.

9. Hydraulic control device according to claim 8, in which the throttle is located in the slider member.

10. Hydraulic control device according to claim 8, in which at least one of the pressure connection and the channel open by way of an annular groove into the side wall or circumferential wall.

11. Hydraulic control device according to claim 8, in which a distance between the mouth of the pressure connection into the circumferential wall and a mechanical stop member for the slider member on the side remote from the metering pump is larger than the path traversed by the slider member until it comes to bear on the metering pump.

* * * * *